United States Patent
Betensky

[11] 3,942,876
[45] Mar. 9, 1976

[54] TELEPHOTO LENS
[75] Inventor: Ellis I. Betensky, Toronto, Canada
[73] Assignee: Ponder & Best, Inc., Santa Monica, Calif.
[22] Filed: May 9, 1974
[21] Appl. No.: 468,473

Related U.S. Application Data
[63] Continuation-in-part of Ser. No. 286,920, Sept. 7, 1972, abandoned, which is a continuation-in-part of Ser. No. 179,304, Sept. 10, 1971, abandoned.

[52] U.S. Cl. ................................ 350/215; 350/255
[51] Int. Cl.² ........................................ G02B 9/62
[58] Field of Search ........... 350/214, 215, 216, 217, 350/218, 219, 255

[56] References Cited
UNITED STATES PATENTS

| | | |
|---|---|---|
| 2,187,780 | 1/1940 | Gehrke et al. ....................... 350/216 |
| 2,528,212 | 10/1950 | Cook .................... 350/219 |
| 2,604,013 | 7/1952 | Schade.................... 350/216 X |
| 3,183,813 | 5/1965 | Wohner et al. ................. 350/255 X |
| 3,295,407 | 1/1967 | Jeffree ...................... 350/255 UX |
| 3,524,700 | 8/1970 | Eggert et al. ...................... 350/218 |
| 3,612,661 | 10/1971 | Determann et al. ............ 350/219 X |
| 3,815,974 | 6/1974 | Momiyama ..................... 350/255 X |

*Primary Examiner*—John K. Corbin
*Attorney, Agent, or Firm*—DeLio and Montgomery

[57] ABSTRACT

A telephoto photographic lens having internal aberration compensation and comprising an objective which is movable for focusing and a rear lens which is stationary with respect to the film plane. The rear lens has an equivalent focal length greater than that of the overall lens and may have negative power which presents a slight change in the equivalent length of the overall lens when the lens is close focused.

18 Claims, 6 Drawing Figures

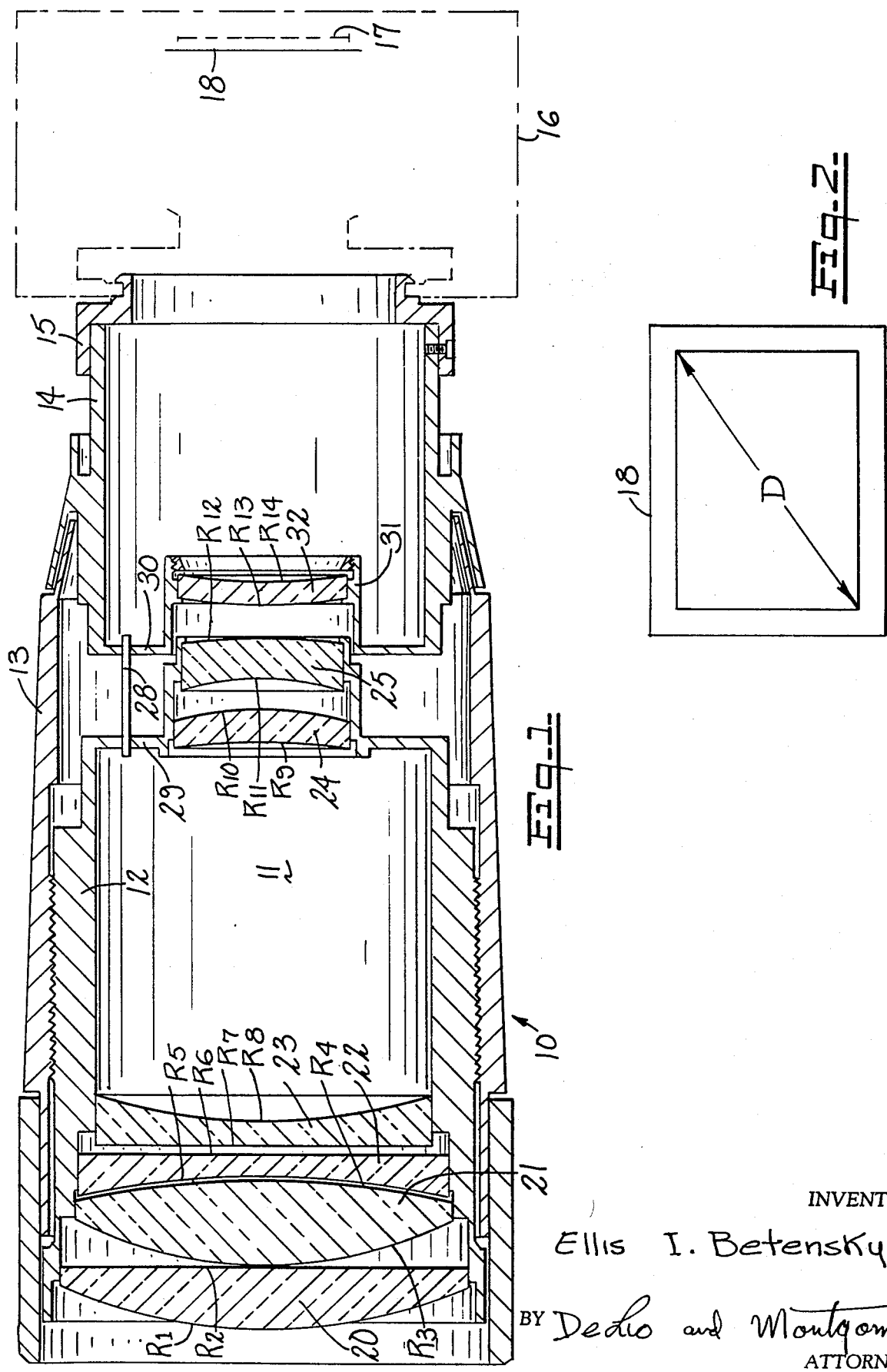

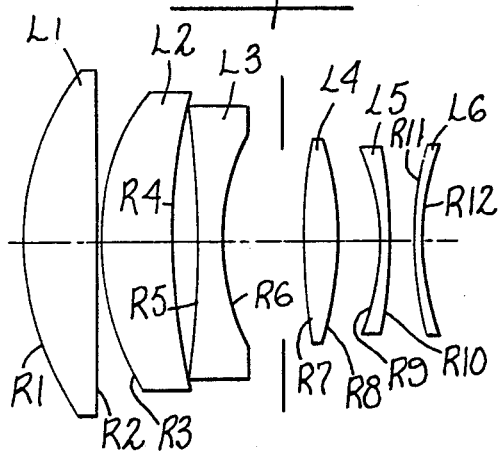
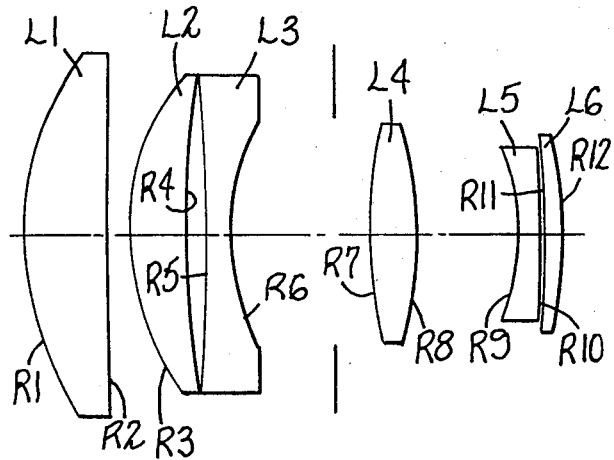
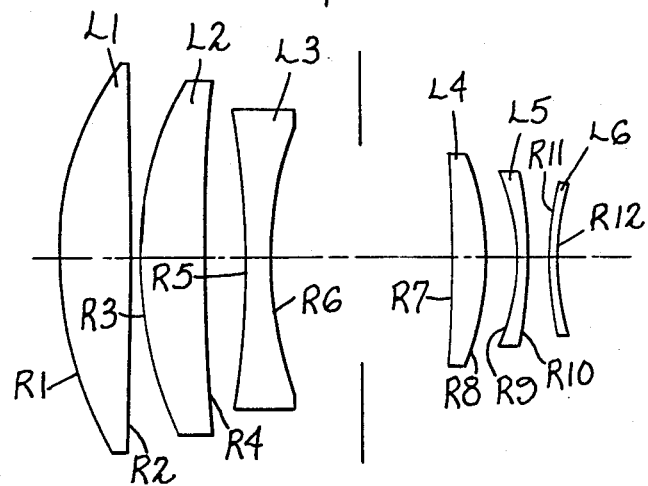
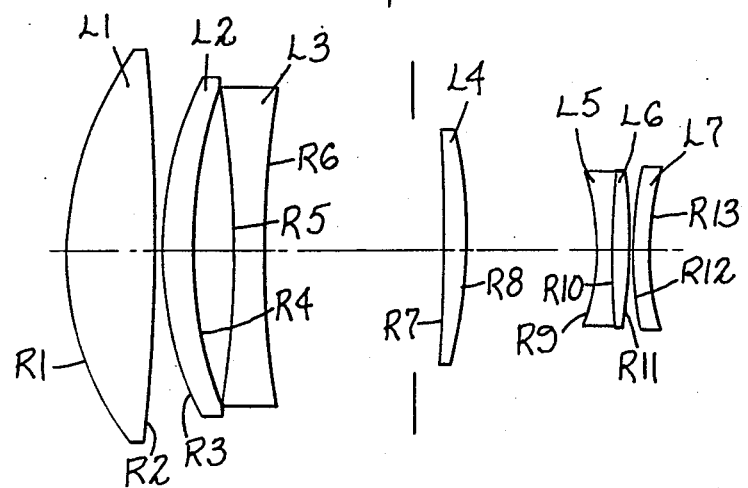

TELEPHOTO LENS

This application is a continuation-in-part of copending application Ser. No. 286,920, filed Sept. 7, 1972, which was a continuation-in-part of and copending with Ser. No. 179,304, filed Sept. 10, 1971, both now abandoned.

This invention relates to photographic lenses, and more particularly relates to telephoto lenses.

As used herein the term telephoto as applied to lenses means a lens where the equivalent focal (EFL) length is greater than the front vertex distance (FVD), the FVD being the distance from the object side of the first lens element to the image plane.

Moderately long focal length telephoto objectives such as a 300 millimeter objective for 35 millimeter cameras have traditionally focused on objects no closer than approximately 10 times the focal length. One reason for this limitation is focusing for a particular object distance requires an objective lens travel which is proportional to the square of the focal length. For closeup focusing, this results in extensive lens travel, requiring either several turns of the focusing ring or potential imprecise focusing resulting from a large thread pitch angle of the focusing ring. Additionally, with large focusing travel it is difficult to achieve linkage with an automatic diaphragm as utilized on many 35 millimeter single lens reflex cameras.

Another difficulty in achieving close focus is poor image quality. In order to achieve compactness in a telephoto objective, the focal lengths of the individual lens components must be considerably shorter than a non-telephoto objective of the same focal length. The change of aberration correction as a function of magnification change is a complicated function which increases rapidly with decreased focal length of the components.

The degradation in image quality as a function of magnification or focusing distance varies from one lens type to another but, for example, if a 300 millimeter objective is optimized for approximately 35 feet object distance, the image quality at 10 feet object distance will be greatly degraded. If a closer object distance were required, image quality could degenerate to the point of being unacceptable even for novel use.

Ordinarily, various lens types are optimized for a predetermined distance. When the objective is moved the spherical aberration or axial imagery will not change significantly. However, as the lens is focused closer, the off-axis imagery will change significantly.

It has previously been proposed to correct for the off-axis imagery by adding a single fixed positive power element behind triplet type movable focusing elements. However, this is not applicable to telephoto lenses and further required focusing travel from infinity to closest focusing which was greater than the EFL of the lens. This is unacceptable in telephoto lenses for single lens reflex cameras.

The present invention provides a lens structure which overcomes the aforementioned problem to permit relatively long focal length telephoto lenses to be focused more closely without degradation of the off-axis imagery and with a minimum focusing travel.

This is achieved by providing a telephoto lens using a relatively long focal length lens at a fixed position with reference to the film plane. Then, as the lens is focused, only the foremost portion of the lens moves while the rear component remains fixed with respect to the film.

In such an arrangement, with the rear lens element fixed in location to the film plane, when the front elements are moved, the spherical aberration or axial imagery will not change significantly. The off-axis imagery, however, would ordinarily change significantly. With the proper design of the rear group, the change will have a compensating effect to that which would normally occur without the correcting element, without degradation of the on-axis imagery.

Another feature of the invention is that the focal length of the lens as a total unit thus experiences a small change as the front or objective portion is moved for closer focusing. This small change in focal length results in a large decrease in focusing travel.

An object of this invention is to provide a new and improved telephoto photographic lens.

Another object of this invention is to provide a new and improved telephoto lens structure for correcting off-axis aberration while allowing closer focusing of the lens with respect to an object to be photographed.

Another object of this invention is to provide a new and improved simplified telephoto lens structure which permits closer focusing of a lens of relatively long predetermined focal length, without excessive travel of the objective elements.

The features of the invention which are believed to be novel are particularly pointed out and distinctly claimed in the concluding portion of this specification. However, the invention both as to its operation and organization together with further objects and advantages thereof may best be appreciated by reference to the following detailed description taken in conjunction with the drawings, wherein:

FIG. 1 is a longitudinal view, partially in cross section of a lens embodying the invention;

FIG. 2 is a representation of the image frame of a camera;

FIGS. 3 and 4 are representations of six element lenses embodying the invention scaled to an equivalent focal length of 135mm for a 24 × 36mm image size camera; and FIGS. 5 and 6 are representations of six element lenses embodying the invention scaled to an equivalent focal length of 200mm for a 24 × 36mm image frame camera.

A lens assembly 10 embodying the invention generally comprises a housing 11 which includes a barrel 12, a focusing ring or sleeve 13 and a mounting member 14.

The mounting member 14 includes mounting means generally indicated by the reference numeral 15 adapted to mount the lens to a camera body indicated in broken line by the reference numeral 16. The camera body 16 will have means defining a film plane 17. Also defined in the camera body will be means defining an image frame which is mounted just before the film plane, generally indicated by the numeral 18 which is also shown diagrammatically in FIG. 2.

Mounted to the barrel for movement therewith are objective lens elements 20, 21, 22, 23 and 24 and 25. When the focusing ring 13, which is threadably connected to the barrel, is rotated the barrel 12 will move longitudinally with respect to focusing ring 13. A pin or guide 28 or other suitable means extends between mounting member 14 and depending portion 29 of barrel 12 to prevent rotation of the barrel and insure only linear movement thereof. Mounting member 14 at the forward end thereof has a radially inwardly direct flange 30 and an axially directed lens mount 31. Mount 31 carries therein an aberration correction or compensating lens 32 which is at all times held in fixed relation to film plane 17.

Where the equivalent focal length of the lens is greater than the diagonal of the film plane by a factor of three of more a negative meniscus may be used as the corrector element. Generally, for a relative aperture of about $f/3.0$ a singlet corrector lens is adequate. For larger relative apertures, a doublet corrector may be utilized. However, this will depend on the overall lens design.

It has been determined that when the front elements 20 – 25 are moved in barrel 12, the off-axis imagery would ordinarily change significantly. However, with the provision of the correcting element 32, the off-axis or lateral aberration is compensated without degradation of the on-axis image.

The correcting element is chosen to have an effective focal length (EFL) equal to or greater than twice the back focal length (BFL) of the overall lens, where the BFL is equal to or greater than 0.9D, where D is a diagonal measure of the image frame, as exemplified in FIG. 2.

With this arrangement the spherical aberration or axial imagery will not change significantly as the objective portion alone is moved. However, the correcting element 32 will compensate for the change in off-axis imagery which would be significant in the absence of the correcting element.

The compensating lens 32 is a negative power meniscus having a concave image side surface. In this construction, the focal length of the overall lens decreases as the front portion is moved for focusing on a closeup object. Because of the relationship between focusing travel and focal length a small change in focal length results in a large difference in focusing travel. Thus a 300 millimeter lens for a 24 × 36mm image frame which would normally focus to 10 feet could focus to 5 feet with the same lens travel.

Table I sets forth data for the lens of FIG. 1, as scaled to an EFL of 300mm for a 24 × 36mm image frame, with a relative aperture of $f/4.5$.

TABLE I

| Lens | | Radius | Axial Distance Between Surfaces | $N_d$ | $V_d$ |
|---|---|---|---|---|---|
| L1 (20) | R1 = | 86.177mm | 10.000mm | 1.498 | 66.7 |
| | R2 | −4025.350 | 0.300 | | |
| L2 (21) | R3 | 68.910 | 13.300 | 1.533 | 45.9 |
| | R4 | −177.800 | 0 | | |
| L3 (22) | R5 | −177.800 | 6.000 | 1.613 | 43.8 |
| | R6 | − plano | 1.810 | | |
| L4 (23) | R7 | 3140.932 | 6.000 | 1.847 | 23.8 |
| | R8 | 83.236 | 58.272 | | |
| L5 (24) | R9 | −322.731 | 5.794 | 1.785 | 25.6 |
| | R10 | − 52.222 | 3.796 | | |
| L6 (25) | R11 | − 40.0201 | 6.280 | 1.816 | 44.5 |
| | R12 | −419.537 | 1.22 – 20.491 | | |
| L7 (32) | R13 | 132.6794 | 3.828 | 1.516 | 64.0 |
| | R14 | 76.992 | 93.39 | | |

Where $N_d$ is the index of refraction and $V_d$ is the Abbe number.

The lens specified may be termed a compact telephoto inasmuch as the ratio of the front vertex distance (FVD) to the equivalent focal length is less than 0.7.

This lens utilizes a negative meniscus 32 as the aberration correction element. The meniscus 32 has an EFL $= -363$mm, and the overall lens has a vertex-to-vertex distance of 126.23mm. The front vertex distance is 210mm.

The equivalent focal length of the corrector lens 32 is − 363mm, more than twice the BFL (93.39mm) of the overall lens, and the BFL is greater than 0.7 of the diagonal D of the image frame. The space between elements 25 and 32 varies from 1.22mm to 20.491mm for focusing from 7 feet to infinity. The corrector element 32 as well as the mechanical design of the lens housing in this lens permits focusing as close as five focal lengths without unacceptable lateral aberration for most purposes.

FIG. 3 exemplifies a telephoto lens of 135mm EFL, as scaled for a 24 × 36mm image frame, and having a relative aperture of $f/2.3$. The data of this lens is set forth in Table II.

TABLE II

| Lens | | Radius | Axial Distance Between Surfaces | $N_d$ | $V_d$ |
|---|---|---|---|---|---|
| L1 | R1 = | 45.6583mm | 12.15mm | 1.6228 | 56.9 |
| | R2 | −3538.80 | 0.34 | | |
| L2 | R3 | 45.5236 | 11.13 | 1.5168 | 64.2 |
| | R4 | 77.8311 | 4.64 | | |
| L3 | R5 | −145.2645 | 3.51 | 1.80518 | 25.5 |
| | R6 | 35.1509 | 19.22 | | |
| L4 | R7 | 95.1885 | 6.93 | 1.64769 | 33.8 |
| | R8 | −44.2681 | 4.58 | | |
| L5 | R9 | −37.3576 | 2.00 | 1.6223 | 53.1 |

TABLE II-continued

| Lens | | Radius | Axial Distance Between Surfaces | $N_d$ | $V_d$ |
|---|---|---|---|---|---|
| | R10 | −95.1509 | | | |
| | | | 0.87 − 10.4 | | |
| L6 | R11 | 62.1185 | | | |
| | | | 2.00 | 1.54814 | 45.8 |
| | R12 | 44.4264 | | | |
| | | | 59.67 | | |

Where $N_d$ is the index of refraction and $V_d$ is the Abbe number. The front vertex distance when focused to infinity is 127.04mm. The corrector element L6 is again a negative meniscus. Its EFL is − 296.4mm. The space between elements L5 and L6 varies from 0.87 − 10.4mm for focusing from infinity to 1500mm or less than 59 inches.

FIG. 4 exemplifies another telephoto lens of 135mm EFL as scaled for a 24 × 36mm image frame, and having a relative aperture of f/2.3. The data of the lens is set forth in Table III.

TABLE III

| Lens | | Radius | Axial Distance Between Surfaces | $N_d$ | $V_d$ |
|---|---|---|---|---|---|
| L1 | R1 | 51.237mm | | | |
| | | | 12.918mm | 1.623 | 56.9 |
| | R2 | 759.41 | | | |
| | | | 3.977 | | |
| L2 | R3 | 40.464 | | | |
| | | | 8.653 | 1.498 | 65.1 |
| | R4 | 103.150 | | | |
| | | | 3.806 | | |
| L3 | R5 | −317.56 | | | |
| | | | 4.000 | 1.805 | 25.5 |
| | R6 | 36.719 | | | |
| | | | 23.467 | | |
| L4 | R7 | 101.995 | | | |
| | | | 6.936 | 1.699 | 30.1 |
| | R8 | −64.646 | | | |
| | | | 15.544 | | |
| L5 | R9 | −41.418 | | | |
| | | | 2.800 | 1.806 | 40.7 |
| | R10 | −645.29 | | | |
| | | | 1.0 − 18.321 | | |
| L6 | R11 | −187.767 | | | |
| | | | 3.400 | 1.596 | 39.2 |
| | R12 | −96.478 | | | |
| | | | 40.485 | | |

Where $N_d$ is the index of refraction and $V_d$ is the Abbe number. The front vertex distance when focused to infinity is 126.99mm. Here the corrector element is a positive meniscus having an EFL of 327mm. The space between elements L5 and L6 varies from 1.0 − 18.321mm for focusing from infinity to 1606mm, or about 63 inches.

FIG. 5 exemplifies a telephoto lens of 200mm EFL, as scaled for a 24 × 36mm image frame, and having a relative aperture of f/3.0. The data of this lens is set forth in Table IV.

TABLE IV

| Lens | | Radius | Axial Distance Between Surfaces | $N_d$ | $V_d$ |
|---|---|---|---|---|---|
| L1 | R1 = | 56.828mm | | | |
| | | | 12.0mm | 1.56873 | 63.1 |
| | R2 | 3586.0 | | | |
| | | | .5 | | |
| L2 | R3 | 62.384 | | | |
| | | | 11.3 | 1.51680 | 64.2 |
| | R4 | 428.03 | | | |
| | | | 5.46 | | |
| L3 | R5 | −254.83 | | | |
| | | | 4.13 | 1.80518 | 25.5 |
| | R6 | 64.06 | | | |
| | | | 29.21 | | |
| L4 | R7 | −1567.0 | | | |
| | | | 5.61 | 1.80518 | 25.5 |
| | R8 | −54.70 | | | |
| | | | 5.24 | | |
| L5 | R9 | −38.14 | | | |
| | | | 1.85 | 1.71270 | 43.3 |
| | R10 | −157.93 | | | |
| | | | 3.2 − 15.0 | | |
| L6 | R11 | 71.98 | | | |
| | | | 2.0 | 1.57957 | 53.7 |
| | R12 | 47.56 | | | |
| | | | 77.5 | | |

Where $N_d$ is the index of refraction and $V_d$ is the Abbe number. The front vertex distance is 157.9mm. The corrector element L6 is a negative meniscus having an EFL of −240.4. The space between elements L5 and L6 varies from 3.2 − 15.0mm for focusing between infinity and 2372mm or about 93 inches.

FIG. 6 exemplifies another telephoto lens of 200mm EFL, as scaled for a 24 × 36mm image frame, and having a relative aperture of f/3.0. The data of this lens is set forth in Table V.

TABLE V

| Lens | | Radius | Axial Distance Between Surfaces | $N_d$ | $V_d$ |
|---|---|---|---|---|---|
| L1 | R1 | 52.385mm | | | |
| | | | 14.500mm | 1.487 | 70.4 |
| | R2 | −230.818 | | | |
| | | | .200 | | |
| L2 | R3 | 56.439 | | | |
| | | | 5.000 | 1.487 | 70.4 |
| | R4 | 69.663 | | | |
| | | | 7.400 | | |
| L3 | R5 | −124.986 | | | |
| | | | 5.000 | 1.805 | 25.5 |
| | R6 | 254.784 | | | |
| | | | 3.753 | | |
| L4 | R7 | −473.491 | | | |
| | | | 21.149 | 1.648 | 33.8 |
| | R8 | −82.955 | | | |
| | | | 2.50 | | |
| L5 | R9 | −33.700 | | | |
| | | | 3.00 | 1.831 | 36.5 |
| | R10 | 150.746 | | | |
| L6 | | | 0 | 1.805 | 25.5 |
| | R11 | −61.451 | | | |
| | | | .20 − 16.59 | | |
| L7 | R12 | 52.686 | | | |
| | | | 3.0 | 1.517 | 64.2 |
| | R13 | 43.100 | | | |
| | | | 63.4 | | |

Where $N_d$ is the index of refraction and $V_d$ is the Abbe number. The front vertex distance is 156.88mm. The corrector element L6 is a negative meniscus. Its EFL is −512.3mm. The space between elements L5 and L6 varies from 0.20 − 16.59mm for focusing from infinity to 2285mm, or about 90 inches.

All of the lenses disclosed comprise a six-element design. In each case the first element is of positive power having a convex front (object side) surface and a very large radius rear surface; the second element is positive with a convex front surface (a doublet in the lens of FIG. 1); the third element is negative with a concave rear surface followed by the aperture stop; the fourth element is positive with a convex rear surface; and the fifth element is negative with a convex rear surface. The compensating element with the exception of FIG. 4 is a negative meniscus with the concave side toward the image plane.

The lens of FIGS. 1 and 3 − 5 are of the so-called SONNAR type which generally may be classified in three groups, a positive leading group, a negative group which has its largest optical power contribution on the surface farthest from the first group, and a positive group separated from the first two groups by the aperture stop. The corrector follows the second positive group. The individual groups may be divided into positive and negative elements either cemented or separated by an air space. This type of lens arrangement is useful when a large aperture or a small telephoto ratio FVD/EFL is required.

Besides correcting for off-axis imagery, the stationary corrector element introduces a small change in EFL with focusing travel. The effect, where the corrector is of negative power is to slightly decrease the EFL. Since the focusing travel is a function of the square of the EFL, the focusing travel is substantially reduced.

The following Table VI exemplifies the reduced focusing travel of the disclosed embodiments of the invention.

TABLE VI

| LENS | EFL | FOCUSING TRAVEL (FT.) | FOCUSES TO | FT/EFL | EFL CORRECTOR | TELEPHOTO RATIO FVD/EFL |
|---|---|---|---|---|---|---|
| FIG. 1 | 300mm | 19.27mm | 2134mm 7.05EFL | .064 | −363mm | .70 |
| FIG. 3 | 135mm | 9.53 | 1500 11.1EFL | .070 | −296mm | .94 |
| FIG. 4 | 135mm | 17.32 | 1606mm 11.9EFL | .128 | 327mm | .94 |
| FIG. 5 | 200mm | 11.8 | 2372mm 11.81EFL | .059 | −240mm | .79 |
| FIG. 6 | 200mm | 16.39 | 2285mm 11.42EFL | .082 | −502mm | .78 |

In all of the foregoing examples, the EFL of the corrector is less than three times the EFL of the overall lens.

All of the lenses will focus to 12 EFL's or less with focusing travel of less than 13 percent of the EFL. The focusing travel is further substantially reduced when a negative corrector is utilized. Then the focusing travel is no greater than about 8 percent of the EFL. In the case of the lens of FIG. 1, a similar lens optimized without the fixed corrector element would require a focusing travel of over 25.0mm to focus to an object distance of 10.5 EFL. Additionally, the corrector elements provide compensation for the usual changes in off-axis imagery when close focusing.

Where the relative aperture is numerically greater than $f/2.0$ a singlet corrector element will generally suffice. At the longer EFL's the corrector element is of negative power. Then when the lens is close focused the overall EFL will slightly decrease, resulting in decreased focusing travel. At the shorter EFL's, focusing travel is not so critical and the corrector may be of positive power as exemplified in FIG. 4 and Table III.

The present invention provides compact telephoto lenses with movable objectives while maintaining a correcting lens in fixed relation to the film plane. With this arrangement the lens will deliver optimum performance from infinity to closer distances heretofore obtainable.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A photographic lens of substantially constant equivalent focal length adapted to be mounted to a camera which includes an image frame, said lens having an equivalent focal length when focused to infinity greater than its front vertex distance, a lens housing, a plurality of lens elements defining an objective coaxially mounted in said housing, means for moving said objective axially to focus said lens with said elements in fixed relation, a correcting lens for correcting off-axis imagery when said lens is close focused in said housing behind said objective in fixed relation to said housing, said correcting lens having negative power and having an equivalent focal length whose absolute value is no greater than three times the equivalent focal length of the overall lens.

2. The lens of claim 1 wherein said correcting lens is a meniscus.

3. The lens of claim 2 wherein the concave side of said meniscus faces the image.

4. The lens of claim 1 defined substantially by the following data:

| Lens | | Radius | Axial Distance Between Surfaces | $N_d$ | $V_d$ |
|---|---|---|---|---|---|
| L1 | R1 = | 86.177 | | | |
| | | | 10.000 | 1.498 | 66.7 |
| | R2 | −4025.350 | | | |
| | | | 0.300 | | |
| L2 | R3 | 68.910 | | | |
| | | | 13.300 | 1.533 | 45.9 |
| | R4 | −177.800 | | | |
| | | | 0 | | |
| L3 | R5 | −177.800 | | | |
| | | | 6.000 | 1.613 | 43.8 |
| | R6 | − plano | | | |
| | | | 1.810 | | |
| L4 | R7 | 3140.932 | | | |
| | | | 6.000 | 1.847 | 23.8 |
| | R8 | 83.236 | | | |
| | | | 58.272 | | |
| L5 | R9 | −322.731 | | | |
| | | | 5.794 | 1.785 | 25.6 |
| | R10 | −52.222 | | | |
| | | | 3.796 | | |
| L6 | R11 | −40.0201 | | | |
| | | | 6.280 | 1.816 | 44.5 |

-continued

| Lens | | Radius | Axial Distance Between Surfaces | $N_d$ | $V_d$ |
|---|---|---|---|---|---|
| | R12 | −419.537 | | | |
| | | | 1.22 − 20.491 | | |
| L7 | R13 | 132.6794 | | | |
| | | | 3.828 | 1.516 | 64.0 |
| | R14 | 76.992 | | | |
| | | | 93.39 | | |

Where $N_d$ is the index of refraction, $V_d$ is the Abbe number, L1–L7 represent lens elements progressively from the front element to the rearmost element, R1–R14 are the radii of the lens surfaces, the axial distance is measured axially between lens surfaces, and the last axial distance is the back focal length of the lens.

5. The lens of claim 1 defined substantially by the following data:

| Lens | | Radius | Axial Distance Between Surfaces | $N_d$ | $V_d$ |
|---|---|---|---|---|---|
| L1 | R1 = | 45.6583mm | | | |
| | | | 12.15mm | 1.6228 | 56.9 |
| | R2 | −3538.80 | | | |
| | | | 0.34 | | |
| L2 | R3 | 45.5236 | | | |
| | | | 11.13 | 1.5168 | 64.2 |
| | R4 | 77.8311 | | | |
| | | | 4.64 | | |
| L3 | R5 | −145.2645 | | | |
| | | | 3.51 | 1.80518 | 25.5 |
| | R6 | 35.1509 | | | |
| | | | 19.22 | | |
| L4 | R7 | 95.1885 | | | |
| | | | 6.93 | 1.64769 | 33.8 |
| | R8 | −44.2681 | | | |
| | | | 4.58 | | |
| L5 | R9 | −37.3576 | | | |
| | | | 2.00 | 1.6223 | 53.1 |
| | R10 | −95.1509 | | | |
| | | | 0.87 − 10.4 | | |
| | R11 | 62.1185 | | | |
| L6 | | | 2.00 | 1.54814 | 45.8 |
| | R12 | 44.4264 | | | |
| | | | 59.67 | | |

Where $N_d$ is the index of refraction, $V_d$ is the Abbe number, L1–L6 represent lens elements progressively from the front element to the rearmost element, R1–R12 are the radii of the lens surfaces, the axial distance is measured axially between lens surfaces, and the last axial distance is the back focal length of the lens.

6. The lens of claim 1 defined substantially by the following data:

| Lens | | Radius | Axial Distance Between Surfaces | $N_d$ | $V_d$ |
|---|---|---|---|---|---|
| L1 | R1 = | 56.828mm | | | |
| | | | 12.0mm | 1.56873 | 63.1 |
| | R2 | 3586.0 | | | |
| | | | .5 | | |
| L2 | R3 | 62.384 | | | |
| | | | 11.3 | 1.51680 | 64.2 |
| | R4 | 428.03 | | | |
| | | | 5.46 | | |
| L3 | R5 | −254.83 | | | |
| | | | 4.13 | 1.80518 | 25.5 |
| | R6 | 64.06 | | | |
| | | | 29.21 | | |
| L4 | R7 | −1567.0 | | | |
| | | | 5.61 | 1.80518 | 25.5 |
| | R8 | −54.70 | | | |
| | | | 5.24 | | |
| L5 | R9 | −38.14 | | | |
| | | | 1.85 | 1.71270 | 43.3 |
| | R10 | −157.93 | | | |
| | | | 3.2 − 15.0 | | |

-continued

| Lens | Radius | Axial Distance Between Surfaces | $N_d$ | $V_d$ |
|---|---|---|---|---|
| | R11 | 71.98 | | |
| L6 | | 2.0 | 1.57957 | 53.7 |
| | R12 | 47.56 | | |
| | | 77.5 | | |

Where $N_d$ is the index of refraction, $V_d$ is the Abbe number, L1–L6 represent lens elements progressively from the front element to the rearmost element, R1–R12 are the radii of the lens surfaces, the axial distance is measured axially between lens surfaces, and the last axial distance is the back focal length of the lens.

7. The lens of claim 1 defined substantially by the following data:

| Lens | Radius | Axial Distance Between Surfaces | $N_d$ | $V_d$ |
|---|---|---|---|---|
| | R1 | 52.385mm | | |
| L1 | | 14.500mm | 1.487 | 70.4 |
| | R2 | −230.818 | | |
| | | .200 | | |
| | R3 | 56.439 | | |
| L2 | | 5.000 | 1.487 | 70.4 |
| | R4 | 69.663 | | |
| | | 7.400 | | |
| | R5 | −124.986 | | |
| L3 | | 5.000 | 1.805 | 25.5 |
| | R6 | 254.784 | | |
| | | 3.753 | | |
| | R7 | −473.491 | | |
| L4 | | 21.149 | 1.648 | 33.8 |
| | R8 | −82.955 | | |
| | | 2.50 | | |
| | R9 | −33.700 | | |
| L5 | | 3.00 | 1.831 | 36.5 |
| | R10 | 150.746 | | |
| L6 | | 0 | 1.805 | 25.5 |
| | R11 | −61.451 | | |
| | | .20 − 16.59 | | |
| | R12 | 52.686 | | |
| L7 | | 3.0 | 1.517 | 64.2 |
| | R13 | 43.100 | | |

Where $N_d$ is the index of refraction, $V_d$ is the Abbe number, L1–L7 represent lens elements progressively from the front element to the rearmost element, R1–R13 are the radii of the lens surfaces, the axial distance is measured axially between lens surfaces, and the last axial distance is the back focal length of the lens.

8. A photographic lens of substantially constant equivalent focal length adapted to be mounted to a camera which includes an image frame, said lens having an equivalent focal length when focused to infinity greater than its front vertex distance, a lens housing, a plurality of lens elements defining a positive objective coaxially mounted in said housing, means for moving said objective axially to focus said lens, a compensating lens for correcting off-axis imagery when said lens is close focused in said housing behind said objective in fixed relation to said housing, said compensating lens being of negative power and acting to slightly decrease the equivalent focal length of the overall lens as said objective is moved forward thereof for close focusing, the equivalent focal length of said compensating lens being no greater than three times the equivalent focal length of the overall lens.

9. The lens of claim 8 wherein said compensating lens is a meniscus and the concave side of said meniscus faces the image.

10. A lens of predetermined essentially fixed equivalent focal length, said equivalent focal length being at least 2.5 times the diagonal of the image frame of a camera adapted to mount said lens, said lens having an equivalent focal length when focused at infinity greater than its front vertex distance, said lens comprising a housing adapted to be mounted to a camera body, a plurality of lens elements coaxially mounted in said housing, means for moving said plurality of element in fixed relation for focusing of said lens, a rear compensating lens fixed in said housing for enabling close focusing of the overall lens with minimal aberrations, said compensating lens being of negative power and comprising a meniscus with the concave surface thereof facing the image plane, the equivalent focal length of said compensating lens being no greater than three times the equivalent focal length of the overall lens.

11. The lens of claim 10 defined substantially by the following data:

| Lens | Radius | Axial Distance Between Surfaces | $N_d$ | $V_d$ |
|---|---|---|---|---|
| | R1 = | 86.177 | | |
| L1 | | 10.000 | 1.498 | 66.7 |
| | R2 | −4025.350 | | |
| | | 0.300 | | |
| | R3 | 68.910 | | |
| L2 | | 13.300 | 1.533 | 45.9 |
| | R4 | −177.800 | | |
| | | 0 | | |
| | R5 | −177.800 | | |
| L3 | | 6.000 | 1.613 | 43.8 |
| | R6 | − plano | | |
| | | 1.810 | | |
| | R7 | 3140.932 | | |
| L4 | | 6.000 | 1.847 | 23.8 |
| | R8 | 83.236 | | |
| | | 58.272 | | |
| | R9 | −322.731 | | |
| L5 | | 5.794 | 1.785 | 25.6 |
| | R10 | −52.222 | | |
| | | 3.796 | | |
| | R11 | −40.0201 | | |
| L6 | | 6.280 | 1.816 | 44.5 |
| | R12 | −419.537 | | |
| | | 1.22 − 20.491 | | |
| | R13 | 132.6794 | | |
| L7 | | 3.828 | 1.516 | 64.0 |
| | R14 | 76.992 | | |
| | | 93.39 | | |

Where $N_d$ is the index of refraction, $V_d$ is the Abbe number, L1–L7 represent lens elements progressively from the front element to the rearmost element, R1–R14 are the radii of the lens surfaces, the axial distance is measured axially between lens surfaces, and the last axial distance is the back focal length of the lens.

12. The lens of claim 10 defined substantially by the following data:

| Lens | Radius | Axial Distance Between Surfaces | $N_d$ | $V_d$ |
|---|---|---|---|---|
| | R1 = | 45.6583mm | | |
| L1 | | 12.15mm | 1.6228 | 56.9 |
| | R2 | −3538.80 | | |
| | | 0.34 | | |
| | R3 | 45.5236 | | |
| L2 | | 11.13 | 1.5168 | 64.2 |
| | R4 | 77.8311 | | |
| | | 4.64 | | |
| | R5 | −145.2645 | | |
| L3 | | 3.51 | 1.80518 | 25.5 |
| | R6 | 35.1509 | | |
| | | 19.22 | | |
| | R7 | 95.1885 | | |
| L4 | | 6.93 | 1.64769 | 33.8 |

3,942,876

-continued

| Lens | | Radius | Axial Distance Between Surfaces | $N_d$ | $V_d$ |
|---|---|---|---|---|---|
| | R8 | −44.2681 | | | |
| L5 | | | 4.58 | | |
| | R9 | −37.3576 | | | |
| | | | 2.00 | 1.6223 | 53.1 |
| | R10 | −95.1509 | | | |
| | | | 0.87 − 10.4 | | |
| | R11 | 62.1185 | | | |
| L6 | | | 2.00 | 1.54814 | 45.8 |
| | R12 | 44.4264 | | | |
| | | | 59.67 | | |

Where $N_d$ is the index of refraction, $V_d$ is the Abbe number, L1–L6 represent lens elements progressively from the front element to the rearmost element, R1–R12 are the radii of the lens surfaces, the axial distance is measured axially between lens surfaces, and the last axial distance is the back focal length of the lens.

13. The lens of claim 10 defined substantially by the following data:

| Lens | | Radius | Axial Distance Between Surfaces | $N_d$ | $V_d$ |
|---|---|---|---|---|---|
| L1 | R1 = | 56.828mm | | | |
| | | | 12.0mm | 1.56873 | 63.1 |
| | R2 | 3586.0 | | | |
| | | | .5 | | |
| | R3 | 62.384 | | | |
| L2 | | | 11.3 | 1.51680 | 64.2 |
| | R4 | 428.03 | | | |
| | | | 5.46 | | |
| | R5 | −254.83 | | | |
| L3 | | | 4.13 | 1.80518 | 25.5 |
| | R6 | 64.06 | | | |
| | | | 29.21 | | |
| | R7 | −1567.0 | | | |
| L4 | | | 5.61 | 1.80518 | 25.5 |
| | R8 | −54.70 | | | |
| | | | 5.24 | | |
| | R9 | −38.14 | | | |
| L5 | | | 1.85 | 1.71270 | 43.3 |
| | R10 | −157.93 | | | |
| | | | 3.2 − 15.0 | | |
| | R11 | 71.98 | | | |
| L6 | | | 2.0 | 1.57957 | 53.7 |
| | R12 | 47.56 | | | |
| | | | 77.5 | | |

Where $N_d$ is the index of refraction, $V_d$ is the Abbe number, L1–L6 represent lens elements progressively from the front element to the rearmost element, R1–R12 are the radii of the lens surfaces, the axial distance is measured axially between lens surfaces, and the last axial distance is the back focal length of the lens.

14. The lens of claim 10 defined substantially by the following data:

| Lens | | Radius | Axial Distance Between Surfaces | $N_d$ | $V_d$ |
|---|---|---|---|---|---|
| L1 | R1 | 52.385mm | | | |
| | | | 14.500mm | 1.487 | 70.4 |
| | R2 | −230.818 | | | |
| | | | .200 | | |
| | R3 | 56.439 | | | |
| L2 | | | 5.000 | 1.487 | 70.4 |
| | R4 | 69.663 | | | |
| | | | 7.400 | | |
| | R5 | −124.986 | | | |
| L3 | | | 5.000 | 1.805 | 25.5 |
| | R6 | 254.784 | | | |
| | | | 3.753 | | |
| L4 | R7 | −473.491 | | | |
| | | | 21.149 | 1.648 | 33.8 |

-continued

| Lens | | Radius | Axial Distance Between Surfaces | $N_d$ | $V_d$ |
|---|---|---|---|---|---|
| | R8 | −82.955 | | | |
| | | | 2.50 | | |
| L5 | R9 | −33.700 | | | |
| | | | 3.00 | 1.831 | 36.5 |
| | R10 | 150.746 | | | |
| L6 | | | 0 | 1.805 | 25.5 |
| | R11 | −61.451 | | | |
| | | | .20 − 16.59 | | |
| L7 | R12 | 52.686 | | | |
| | | | 3.0 | 1.517 | 64.2 |
| | R13 | 43.100 | | | |

Where $N_d$ is the index of refraction, $V_d$ is the Abbe number, L1–L7 represent lens elements progressively from the front element to the rearmost element, R1–R13 are the radii of the lens surfaces, the axial distance is measured axially between lens surfaces and the last axial distance is the back focal length of the lens.

15. A lens having an equivalent focal length greater than its front vertex distance when focused to infinity comprising a housing adapted to be mounted to a camera, a plurality of lens elements coaxially mounted in said housing and movable axially in fixed relation for focusing of said lens, a corrector lens in said housing behind said plurality and in fixed relation to said housing, said plurality of lens elements defining a first group of positive power, a second group of negative power followed by an aperture stop, and a third positive group, said lens having an equivalent focal length at least two and one-half times the diagonal of the image frame of a camera to which it may be mounted, said fixed lens being of negative power having an equivalent focal length no greater than three times the equivalent focal length of the overall lens, said fixed lens serving to correct for aberrations due to off-axis imagery when said lens is close focused.

16. The lens of claim 15 wherein said corrector lens is a meniscus.

17. The lens of claim 15 wherein the concave side of said meniscus faces the image.

18. A lens defined substantially by the following data as scaled for a 24×36mm image frame and an equivalent focal length of 135mm:

| Lens | | Radius | Axial Distance Between Surfaces | $N_d$ | $V_d$ |
|---|---|---|---|---|---|
| L1 | R1 | 51.237mm | | | |
| | | | 12.918mm | 1.623 | 56.9 |
| | R2 | 759.41 | | | |
| | | | 3.977 | | |
| | R3 | 40.464 | | | |
| L2 | | | 8.653 | 1.498 | 65.1 |
| | R4 | 103.150 | | | |
| | | | 3.806 | | |
| | R5 | −317.56 | | | |
| L3 | | | 4.000 | 1.805 | 25.5 |
| | R6 | 36.719 | | | |
| | | | 23.467 | | |
| | R7 | 101.995 | | | |
| L4 | | | 6.936 | 1.699 | 30.1 |
| | R8 | −64.646 | | | |
| | | | 15.544 | | |
| | R9 | −41.418 | | | |
| L5 | | | 2.800 | 1.806 | 40.7 |
| | R10 | −645.29 | | | |
| | | | 1.0 − 18.321 | | |
| | R11 | −187.767 | | | |
| L6 | | | 3.400 | 1.596 | 39.2 |
| | R12 | −96.478 | | | |
| | | | 40.485 | | |

Where $N_d$ is the index of refraction, $V_d$ is the Abbe number, L1–L6 represent lens elements progressively from the front element to the rearmost element, R1–R12 are the radii of the lens surfaces, the axial distance is measured axially between lens surfaces; and the last axial distance is the back focal length of the lens.

* * * * *